(12) United States Patent
Sato (10) Patent No.: US 6,445,513 B2
(45) Date of Patent: Sep. 3, 2002

(54) SINGLE-FOCUS LENS

(76) Inventor: Kenichi Sato, c/o Fuji Photo Optical Co., Ltd. 1-324, Uetake, Omiya City, Saitama, 330-8624 (JP)

( * ) Notice: Subject to any disclaimer, the term of this patent is extended or adjusted under 35 U.S.C. 154(b) by 2 days.

(21) Appl. No.: 09/790,039

(22) Filed: Feb. 21, 2001

(30) Foreign Application Priority Data

Feb. 29, 2000 (JP) ........................................ 2000-053785
Mar. 8, 2000 (JP) ........................................ 2000-062991

(51) Int. Cl.$^7$ .............................. G02B 9/60; G02B 13/18
(52) U.S. Cl. ........................................ 359/763; 359/714
(58) Field of Search ................................ 359/754–757, 359/761, 763–764, 770–772, 781, 708, 713–714

(56) References Cited

U.S. PATENT DOCUMENTS

| 4,073,575 | A | * | 2/1978 | Koizumi ..................... 359/755 |
| 5,215,545 | A | * | 6/1993 | Saito ......................... 359/661 |
| 5,757,553 | A | * | 5/1998 | Sugawara ................... 359/643 |

FOREIGN PATENT DOCUMENTS

| JP | 08-152555 | 6/1996 |
| JP | 09-090213 | 4/1997 |

* cited by examiner

*Primary Examiner*—Jordan M. Schwartz
(74) *Attorney, Agent, or Firm*—Frommer Lawrence & Haug, LLP; Matthew K. Ryan (57) ABSTRACT

Provided is a single-focus lens in which cost reduction and a simple configuration with a shorter overall length are realized as well as preferable optical performance is achieved. In the single-focus lens, consecutively arranged form the object side are a first lens which is a meniscus lens and its concave surface faces the object side, a second lens which is a meniscus lens and has at least one aspheric surface, a third lens, both of whose surfaces are concave surfaces, a fourth lens, both of whose surfaces are convex surfaces and a fifth lens which is a meniscus lens and its concave surface faces the image surface, the fifth lens having at least one aspheric surface. Preferably, the second lens and the fifth lens are made of optical plastics.

6 Claims, 6 Drawing Sheets

| Si (Surface No.) | ri (Radius of curvature) | di (Surface separation) | ndi (Refractive index) | νdi (Abbe's No.) |
|---|---|---|---|---|
| 1 | -19.747 | 1.50 | 1.84665 (nd1) | 23.9 (νd1) |
| 2 | -10.558 | 0.20 | | |
| 3 (Aspheric surface) | 5.500 | 1.50 | 1.49023 | 57.5 |
| 4 (Aspheric surface) | 5.500 | 2.07 | | |
| 5 | -11.781 | 0.60 | 1.84665 | 23.9 (νd3) |
| 6 | 5.879 | 0.10 | | |
| 7 | 8.787 | 3.20 | 1.81600 | 46.7 (νd4) |
| 8 | -3.665 | 0.20 | | |
| 9 (Aspheric surface) | 5.000 | 2.00 | 1.49023 | 57.5 |
| 10 (Aspheric surface) | 4.020 | 2.31 | | |
| 11 | 0.0 | 1.30 | 1.51679 | 64.1 |
| 12 | 0.0 | | | |

FIG.2B

| Si | Aspheric surface coefficient | | | | |
|---|---|---|---|---|---|
| | K | A4 | A6 | A8 | A10 |
| 3 | 4.622327 | $1.321729 \times 10^{-4}$ | $-9.347904 \times 10^{-4}$ | $8.874909 \times 10^{-5}$ | $-3.066958 \times 10^{-5}$ |
| 4 | 2.137535 | $4.891821 \times 10^{-3}$ | $-6.617897 \times 10^{-4}$ | $-5.852478 \times 10^{-4}$ | $-5.268377 \times 10^{-5}$ |
| 9 | -1.433869 | $7.845808 \times 10^{-4}$ | $-2.058056 \times 10^{-4}$ | $-9.497387 \times 10^{-5}$ | $7.324729 \times 10^{-6}$ |
| 10 | -0.410453 | $6.663663 \times 10^{-3}$ | $-1.228416 \times 10^{-3}$ | $-6.407134 \times 10^{-5}$ | $9.340816 \times 10^{-6}$ |

FIG.2C

| f | 5.89 |
|---|---|
| Fno | 4.8 |
| 2ω | 56.6 |
| 1/f2 | 0.008 |
| 1/f5 | -0.008 |

| Si (Surface No.) | ri (Radius of curvature) | di (Surface separation) | ndi (Refractive index) | νdi (Abbe's No.) |
|---|---|---|---|---|
| 1 | −8.290 | 2.20 | 1.84665 (nd1) | 23.9 (νd1) |
| 2 | −5.867 | 0.134 | | |
| 3 (Aspheric surface) | −16.293 | 1.753 | 1.49023 | 57.5 |
| 4 (Aspheric surface) | −19.305 | 2.5 | | |
| 5 | −9.894 | 0.60 | 1.84665 | 23.9 (νd3) |
| 6 | 8.787 | 4.00 | 1.75500 | 52.3 (νd4) |
| 7 | −4.372 | 0.10 | | |
| 8 (Aspheric surface) | 4.091 | 2.20 | 1.49023 | 57.5 |
| 9 (Aspheric surface) | 3.591 | 2.694 | | |
| 10 | 0.0 | 1.30 | 1.51679 | 64.1 |
| 11 | 0.0 | | | |

FIG.5B

| Si | Aspheric surface coefficient | | | | |
|---|---|---|---|---|---|
| | K | A4 | A6 | A8 | A10 |
| 3 | 8.370292 | $1.037460 \times 10^{-3}$ | $-8.669852 \times 10^{-4}$ | $1.983259 \times 10^{-4}$ | $-4.448510 \times 10^{-5}$ |
| 4 | 1.921225 | $8.231799 \times 10^{-3}$ | $-2.233187 \times 10^{-3}$ | $-6.544081 \times 10^{-4}$ | $-5.791885 \times 10^{-5}$ |
| 9 | −3.122010 | $7.410302 \times 10^{-3}$ | $-9.351372 \times 10^{-4}$ | $3.457885 \times 10^{-6}$ | $2.057938 \times 10^{-6}$ |
| 10 | −0.811296 | $1.056519 \times 10^{-2}$ | $-1.423165 \times 10^{-3}$ | $-4.919288 \times 10^{-5}$ | $1.108121 \times 10^{-5}$ |

FIG.5C

| f | 5.58 |
|---|---|
| Fno | 4.8 |
| 2ω | 56.2 |
| 1/f2 | −0.004 |
| 1/f5 | 0.007 |

SINGLE-FOCUS LENS

BACKGROUND OF THE INVENTION

1. Field of the Invention

The present invention relates to a single-focus lens, for example, used as an imaging lens in an electronic camera (digital camera).

2. Description of the Related Art

In recent years, an electronic camera which images a subject using a solid-state image sensor such as a charge-coupled device (CCD) in place of a silver-salt film has become popular. The electronic camera falls into two types: still camera and video camera. The still camera images still pictures, whereas the video camera images motion pictures. Imaging lenses described in Japanese Unexamined Patent Application Publication No. Hei 8-152555 and No. 9-90213 are examples of conventional imaging lenses used in such electronic cameras. Described in Japanese Unexamined Patent Application Publication No. Hei 8-152555 is an invention regarding an imaging lens having six lenses made of glass. Further, Japanese Unexamined Patent Application Publication No. Hei 9-90213 describes an invention regarding an imaging lens which comprises five lenses: four lenses made of glass and one lens with an aspheric surface made of plastic.

Miniaturization of the electronic camera is in demand as is the camera using silver-salt films. Therefore, desirably the imaging lens used in the electronic camera is simply constituted and downsized having a shorter overall length. Further, desirably the imaging lens is manufactured at a low cost. Conventional imaging lenses, however, do not fully satisfy these requirements. For example, the imaging lens described in Japanese Unexamined Patent Application Publication No. Hei 8-152555 has six lenses made of glass. Six lenses are rather too many and the use of glass for all lenses results in high manufacturing costs. The imaging lens described in Japanese Unexamined Patent Application Publication No. Hei 9-90213 has five lenses and one of these lenses is made of plastic with the aim of cost reduction. However, its overall length is long, thus fails in downsizing.

It is considered that when the imaging lens is constituted having a plurality of lenses with aspheric surfaces, the number of lenses is reduced and its overall length is shortened. The lenses with aspheric surfaces are desirably made of plastic rather than glass in view of costs and productivity. With the lens made of plastic, a change in optical performance due to environmental changes such as changes in temperature or humidity is large as compared to that with the lens made of glass, so that its power has to be set small in order to reduce the changes in optical performance. Thus, when a plurality of aspheric surfaces is used in the imaging lens, desirably, the lenses are made of plastic and power is distributed appropriately considering environmental changes. However, the imaging lens satisfying these requirements has not been developed heretofore.

The present invention has been achieved in view of the above problems and its purpose is to provide a single-focus lens in which cost reduction and a simple configuration with a shorter overall length are realized as well as preferable optical performance is achieved.

SUMMARY OF THE INVENTION

In the single-focus lens of the invention, consecutively arranged from the object side are a first lens element with a meniscus shape having a concave which faces the object side, a second lens element with a meniscus shape having at least one aspheric surface, a third lens element, with two concaves, a fourth lens element, with two convexes and a fifth lens element with a meniscus shape having a concave which faces an image side, the fifth lens element having at least one aspheric surface.

In the single-focus lens of the invention, the second lens element and the fifth lens element are preferably made of optical plastics in view of productivity of aspheric surfaces.

In the single-focus lens of the invention, for the sake of reducing deterioration in optical performance due to environmental changes, desirably the second lens element and the fifth lens element, both of which are made of optical plastics, satisfy conditional expressions $-0.02<1/f_2<0.02$ and $-0.02<1/f_5<0.02$ when $f_2$ represents a focal length of the second lens element and $f_5$ represents a focal length of the fifth lens element.

In the single-focus lens of the invention, in order to correct chromatic aberration, it is desirable to satisfy conditional expressions $1.70<nd_1$, $35<vd_1$, $35<vd_3$, and $35<vd_4$ when the ndi represents a refractive index of the first lens element for a wavelength of d-lines, the $vd_1$ represents Abbe number of the first lens element for the wavelength of d-lines, the $vd_3$ represents Abbe number of the third lens element for the wavelength of d-lines, and the $vd_4$ represents Abbe number of the fourth lens element for the wavelength of d-lines.

In the single-focus lens of the invention, the aforementioned configuration realizes a single focus-lens which has a less number of lenses and a shorter overall length and in which various kinds of aberrations are preferably corrected.

Other and further objects, features and advantages of the invention will appear more fully from the following description.

DETAILED DESCRIPTION OF THE PREFERRED EMBODIMENTS

An embodiment of the present invention will be described in detail below with reference to the accompanying drawings.

Figure 1:
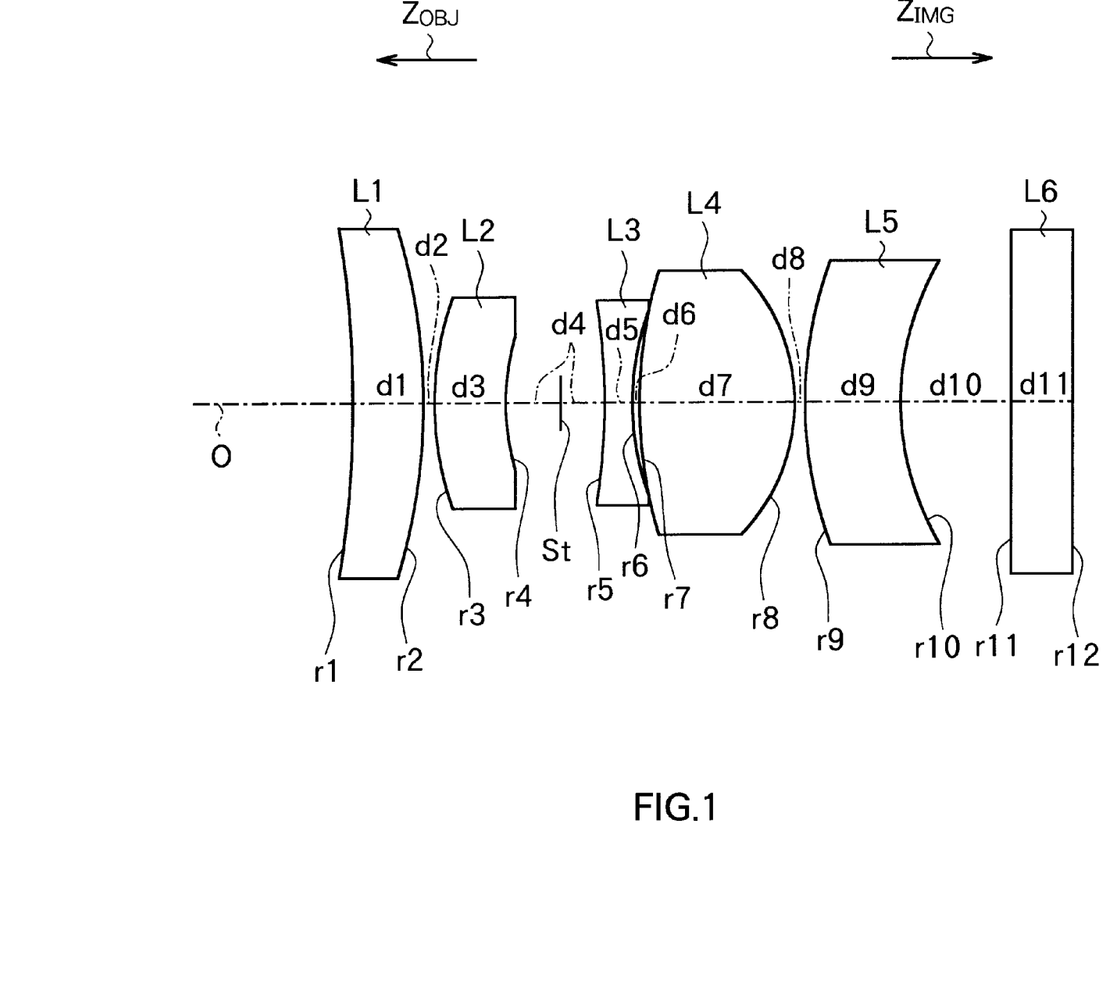
FIG. 1 is a cross sectional view of the configuration of a single-focus lens according to an embodiment of the invention.

FIG. 1 is a schematic diagram of the configuration of a single-focus lens according to an embodiment of the present invention showing each lens element in cross section within a single plane including an optical axis O. In FIG. 1, the side represented by '$Z_{OBJ}$' denotes an object side, i.e., the side where a subject to be imaged is disposed, for example, whereas the side represented by '$Z_{IMG}$' denotes an image side, i.e., the side where the subject on the object side is imaged. In FIG. 1, 'ri' represents radius of curvature of the ith lens surface from the object side and 'di' represents surface separation between the ith lens surface and the [i+1]th lens surface from the object side on the optical axis, where 'i' is integer. In FIG. 1, the line represented by 'St' is a stop of the lens system. The single-focus lens of the embodiment is used as an imaging lens of an electronic camera and imaging surface of an image pickup device such as a CCD is arranged on its image plane, for example.

In the single-focus lens according to the embodiment, consecutively arranged from the object side are a first lens L1 which is a meniscus lens and its concave faces the object side, a second lens L2 which is a meniscus lens and has at least one aspheric surface, a third lens L3, both of whose surfaces are concave, a fourth lens L4, both of whose surfaces are convex and a fifth lens L5 which is a meniscus lens and its concave faces the image side, the fifth lens L5 having at least one aspheric surface. The single-focus lens further has a cover glass L6 arranged closer to the image side than the fifth lens L5. The cover glass L6 protects the imaging surface of the image pickup device such as a CCD. The surface close to the image side of the cover glass L6 is arranged so as to correspond to the image plan, for example. If that is the case, the surface close to the image side of the cover glass L6 abuts on the imaging surface of the image pickup device. The first lens L1 has positive power, for example. The stop St is placed between the second lens L2 and the third lens L3.

Here, although the second lens L2 is a meniscus lens and its convex faces the object side in the configuration as in FIG. 1, the second lens L2 may be constituted in a manner that its concave faces the object side as in Example 1-2 to be described later. The neighboring lens surfaces of the third lens L3 and the fourth lens L4 are not in contact at the center thereof in the configuration as in FIG. 1 but the third lens L3 and the fourth lens L4 may take the form of a cemented lens, joining the third lens L3 and the fourth lens L4 as in Example 1-2 to be described later.

Mainly taking manufacturability of the aspheric surface into account, in the single-focus lens of the embodiment, desirably the second lens L2 and the fifth lens L5 are made of optical plastics. Examples of the optical plastics usable for lens material are acrylic resin, epoxy resin and polycarbonate. Since the optical plastics with low birefringence is considered to exhibit optical performance of high resolution, desirably the second lens L2 and the fifth lens L5 are made of acrylic resin having relatively low birefringence.

In the single-focus of the embodiment, when 'f2' and 'f5' represent focal length of the second lens L2 and the fifth lens L5, respectively, the following conditional expressions (1) and (2) are satisfied desirably.

| $-0.02 < 1/f_2 < 0.02$ | (1) |
| $-0.02 < 1/f_5 < 0.02$ | (2) |

In the single-focus lens of the embodiment, refractive index of the first lens L1 for a wavelength of d-lines (wavelength λ=587.6 nm) is $nd_1$, and Abbe number of the first lens L1, the third lens L3 and the fourth lens L4 for wavelength of d-lines are $vd_1, vd_3$ and $vd_4$, respectively, desirably the following conditional expressions (3) to (6) are satisfied.

| $1.70 < nd_1$ | (3) |
| $35 > vd_1$ | (4) |
| $35 > vd_3$ | (5) |
| $35 < vd_4$ | (6) |

Next, action and effects of the single-focus lens according to the embodiment will be briefly described.

In the single-focus lens of the embodiment, since the first lens L1 is a meniscus lens and its concave faces the object side, the power of the first lens L1 is low. Thus, especially distortion and curvature of field are corrected favorably. Further, since the second lens L2 provided close to the stop St has at least one aspheric surface, not only distortion and curvature of field but also spherical aberration are corrected favorably. The second lens L2 is placed posterior to the first lens L1 made of glass. Therefore, even though the second lens L2 is made of optical plastics, its surfaces are free from scratches. Further, in the single-focus lens of the embodiment, the third lens L3 has a negative power with small Abbe number and the fourth lens L4 has a positive power with large Abbe number, for example, thus chromatic aberration is preferably corrected. In the single-focus lens, since the fifth lens L5 arranged close to the image plane has at least one aspheric surface and is a meniscus lens and its concave faces the image side, especially distortion and curvature of field are favorably corrected.

The conditional expressions (1) and (2) restrict the power of the second lens L2 and the fifth lens L5, respectively. Generally, with respect to a lens made of optical plastics, optical performance such as focal length and the like changes due to environmental changes such as changes in temperature and humidity. The larger power of a lens is, the more remarkably optical performance changes. In the case where the second lens L2 and the fifth lens L5 are made of optical plastics, by restricting the power of the lens so as to satisfy the conditional expressions (1) and (2), deterioration in optical performance due to environmental changes is reduced. When the conditional expressions (1) and (2) are not satisfied, the power of the second lens L2 and the fifth lens L5 increases, thus deterioration in optical performance due to environmental changes increases.

The conditional expressions (3) to (6) restrict materials of the first lens L1, the third lens L3 and the fourth lens L4, and mainly contributes to correction of chromatic aberration. If a lens is made of a material exceeding the range of the conditional expressions (3) to (6), it is difficult to correct chromatic aberration.

As described above, according to the single-focus lens of the embodiment, a plurality of lens surfaces are aspheric surfaces, so that a small number of lenses and a shorter overall length are realized. Further, the lenses with aspheric surfaces are made of optical plastics and power is appropriately distributed among lenses in consideration of environmental changes, so that the single-focus lens is manufactured at low cost and various kinds of aberrations are corrected preferably.

According to the single-focus lens of the embodiment, the use of the aforementioned configuration and satisfying the above conditional expressions realize a low-cost single-focus lens which is simply constituted with a shorter overall length and exhibits optimal optical performance for an imaging lens used, e.g., in the electronic camera.

EXAMPLE 1-1

Next, with reference to FIGS. 2 and 3, a first experimental example (Example 1-1) of the single-focus lens according to the embodiment will be described.

Figure 2A:
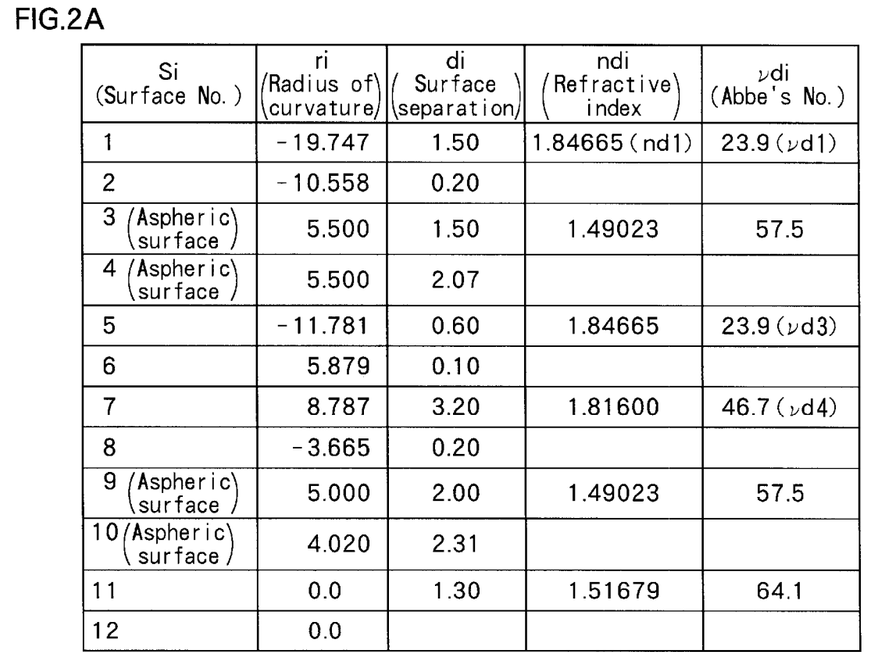
FIGS. 2A, 2B and 2C are explanatory figures of a first experimental example (Example 1-1) with specific numerical values of the single-focus lens according to the embodiment of the invention.
Figure 2B:
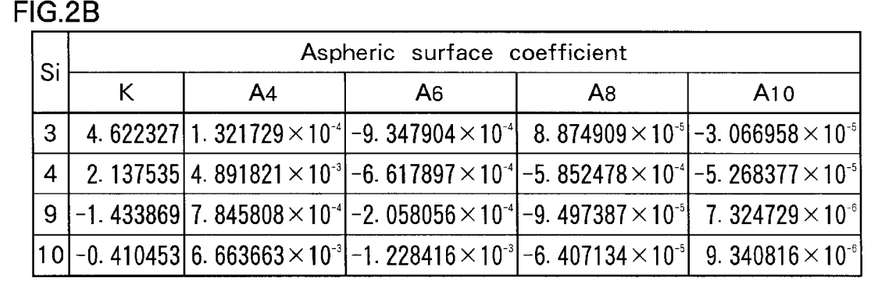

FIGS. 2A to 2C are tables of the Example 1-1 using specific numeral values of the single-focus lens according to the embodiment. In FIGS. 2A and 2B, the surface number $S_i$ indicates the sequence of lens surfaces from the object side. With regard to the refractive index and Abbe number, values relative to the d-line are shown. The '$r_i$' represents radius of curvature of the $_i$th lens surface from the object side similar to the '$r_i$' shown in FIG. 1. Similar to the '$d_i$' as in FIG. 1, the '$d_i$' represents surface separation between the ith lens surface Si and [i+1]th lens surface $S_i$+1 from the object side on the optical axis. The radius of curvature '$r_i$' and the surface separation '$d_i$' are expressed in millimeter (mm). The lens surface having zero (0) radius of curvature ri denotes that the surface is plane in FIG. 2A.

In the single-focus lens according to the Example 1-1, lens surfaces S3 and S4 of the second lens L2 and lens surfaces S9 and S10 of the fifth lens L5 are aspheric surfaces. The second lens L2 and the fifth lens L5 having aspheric surfaces are made of poly methyl-methacrylate (PMMA). FIG. 2B contains coefficients of the aspheric surface K, $A_4$, $A_6$, $A_8$ and $A_{10}$ showing the shape of the lens surfaces S3, S4, S9 and S10. These coefficients of the aspheric surface are used in the polynomial (A) on aspheric surface. The polynomial (A) describes the shape of the aspheric surface taking a Z-axis in a direction along the optical axis and an H-axis in a direction orthogonal to the optical axis O.

$$Z=CH^2/\{1+(1-K\cdot C^2\cdot H^2)^{1/2}\}+A_4H^4+A_6H^6+A_8H^8+A_{10}H^{10} \quad (1)$$

In the polynomial (A), 'H' denotes the distance (height) from the optical axis O to the lens surface and 'Z' denotes the amount of sag on the lens surface at height H. The coefficient K denotes eccentricity and the coefficients $A_4$, $A_6$, $A_8$ and $A_{10}$ denotes fourth-degree, sixth-degree, eighth-degree and tenth-degree coefficients of the aspheric surface. 'C' denotes the reciprocal (1/r) of radius of curvature 'r' of the lens surface close to the optical axis.

Figure 2C:
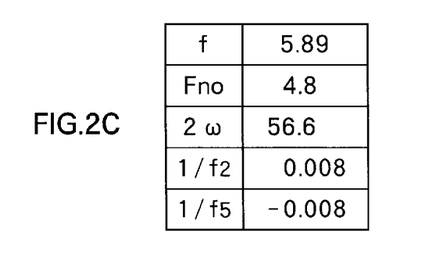

FIG. 2C is a table containing focal distance f, F number (Fno) and field angle (2ω) of the whole optical system showing performance of the single-focus lens according to the Example 1-1. FIG. 2C also shows refractive power $1/f_2$ and $1/f_5$ in accordance with the conditional expressions (1) and (2).

In the single-focus lens of Example 1-1, as shown in FIGS. 2A to 2C, the refractive power $1/f_2$ of the second lens L2 is 0.008, whereas the refractive power $1/f_5$ of the fifth lens L5 is −0.008, which satisfies the conditional expressions (1) and (2). Further, the refractive index nd1 of the first lens L1 relative to the d-line is 1.84665, which satisfies the conditional expression (3). The Abbe number $vd_1$ of the first lens L1 relative to the d-line is 23.9; the Abbe number $vd_3$ of the third lens L3 relative to the d-line is 23.9; and the Abbe number $vd_4$ of the fourth lens relative to the d-line is 46.7, which satisfies the conditional expressions (4) to (6).

Figure 3A:
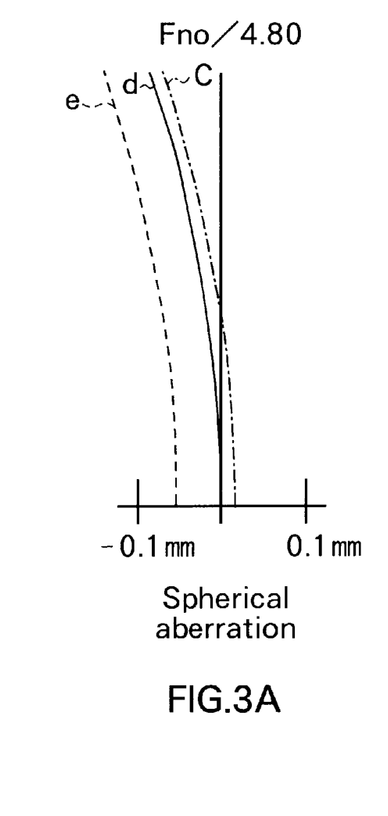
FIGS. 3A, 3B, 3C and 3D are figures showing spherical aberration, astigmatism, distortion and chromatic aberration of magnification of the single-focus lens of Example 1-1 as shown in FIGS. 2A to 2C.
Figure 3B:
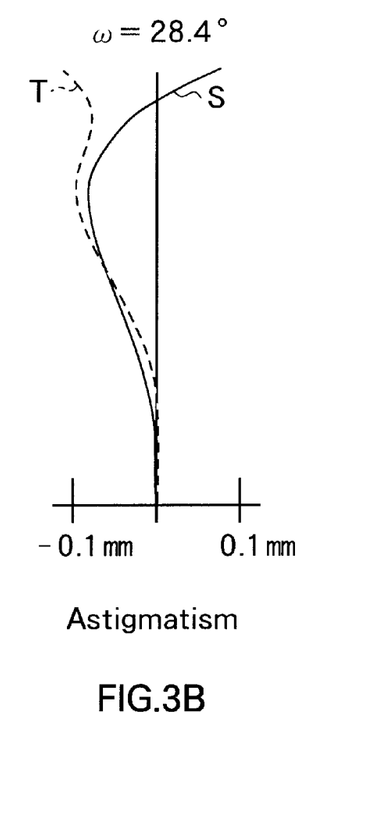
Figure 3C:
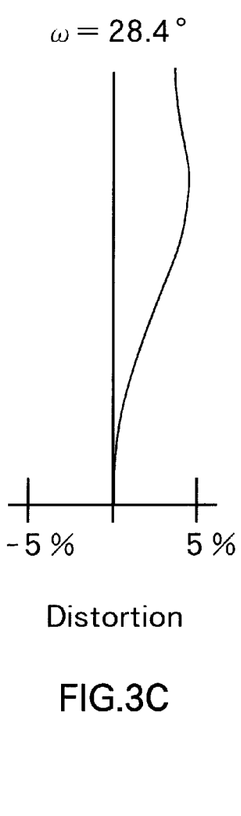
Figure 3D:
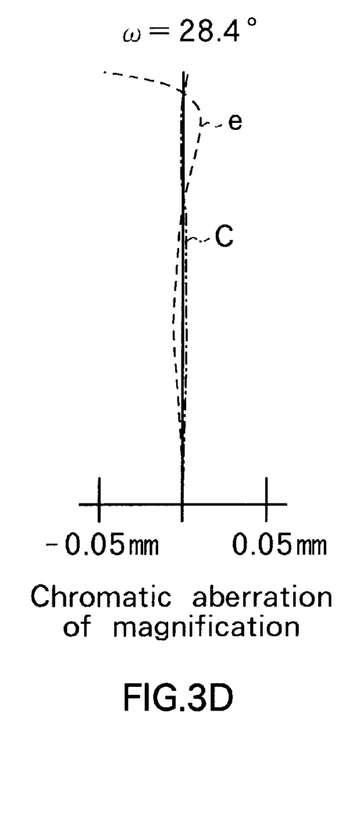

FIGS. 3A, 3B, 3C and 3D show spherical aberration, astigmatism, distortion and chromatic aberration of magnification in the single-focus lens of Example 1-1, respectively. In these figures, 'ω' represents half field angle and 'e', 'd' and 'C' represent the e-line, the d-line and the C-line, respectively. In FIG. 3B showing astigmatism, 'S' represents a sagittal image surface and 'T' represents a meridional (tangential) image surface. Wavelengths of the e-line and the C-line are 546.1 nm and 656.3 nm, respectively.

As apparent from FIGS. 3A to 3D, the single-focus lens in Example 1-1 has a shorter overall length and exhibits optimal optical performance, e.g., for an imaging lens of electronic cameras.

EXAMPLE 1-2

Next, with reference to FIGS. 4 to 6D, a second experimental example (Example 1-2) of the single-focus lens according to the embodiment will be described herein below.

Figure 4:
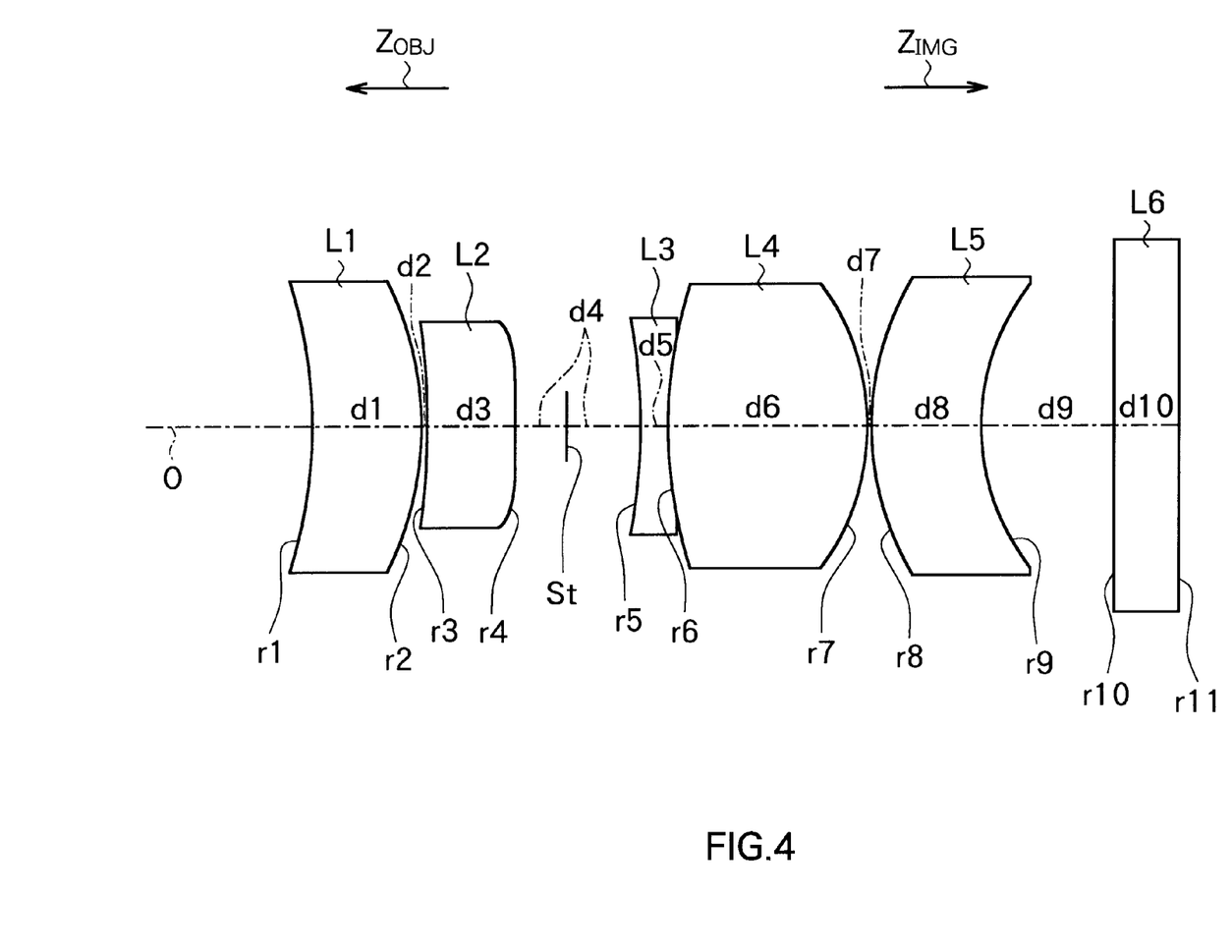
FIG. 4 is a cross sectional view of the configuration of the single-focus lens of a second experimental example (Example 1-2) according to the embodiment of the invention.
Figure 5A:
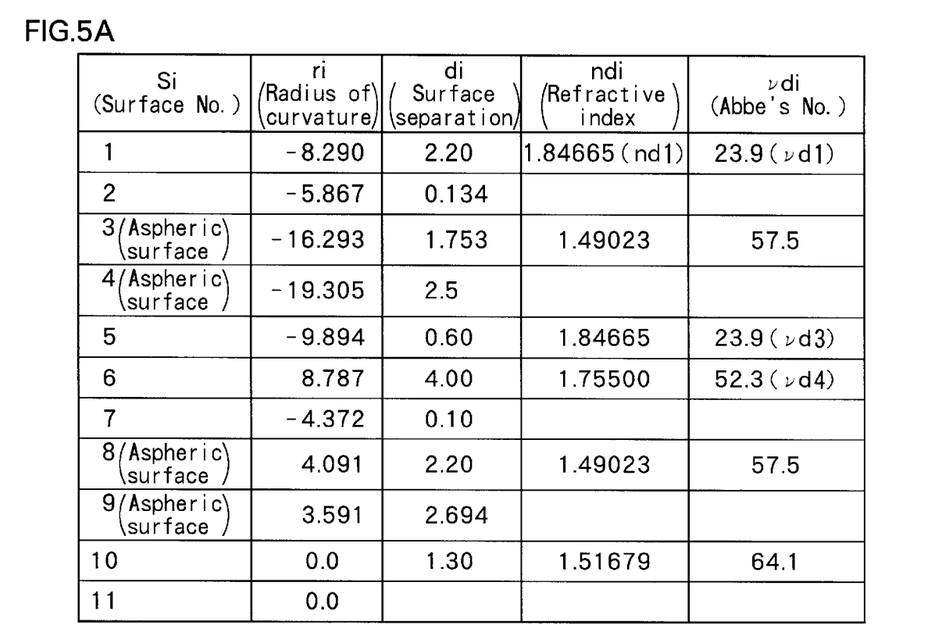
FIGS. 5A, 5B and 5C are explanatory figures of the second experimental example (Example 1-2) with specific numerical values of the single-focus lens according to the embodiment of the invention.
Figure 5B:
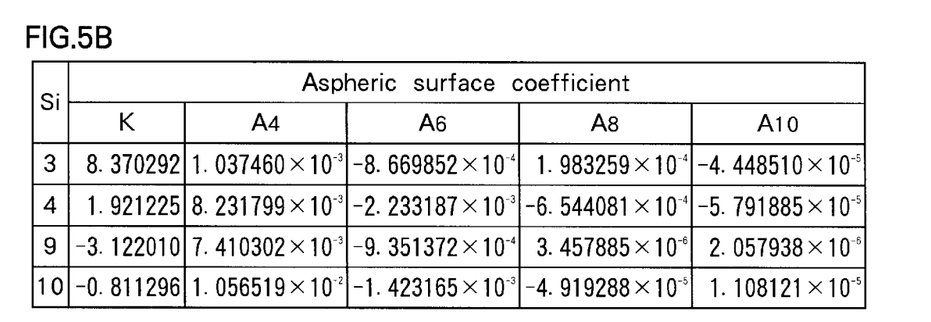
Figure 5C:
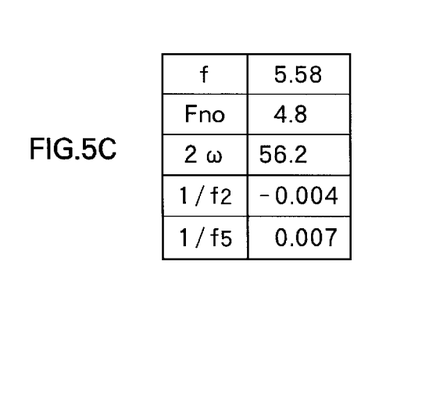
Figure 6A:
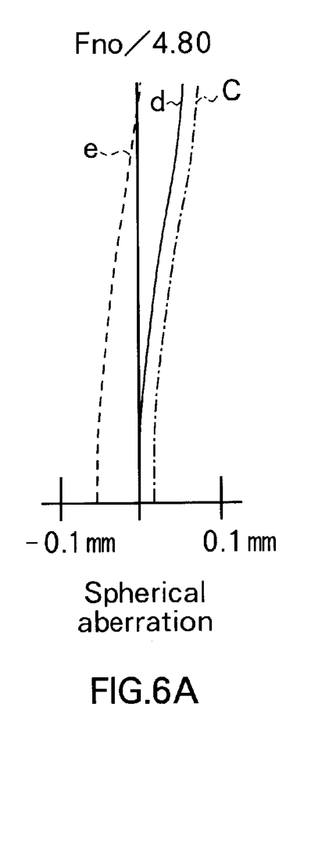
FIGS. 6A, 6B, 6C and 6D are figures showing spherical aberration, astigmatism, distortion and chromatic aberration of magnification of the single-focus lens of Example 1-2 shown in FIGS. 5A to 5C.
Figure 6B:
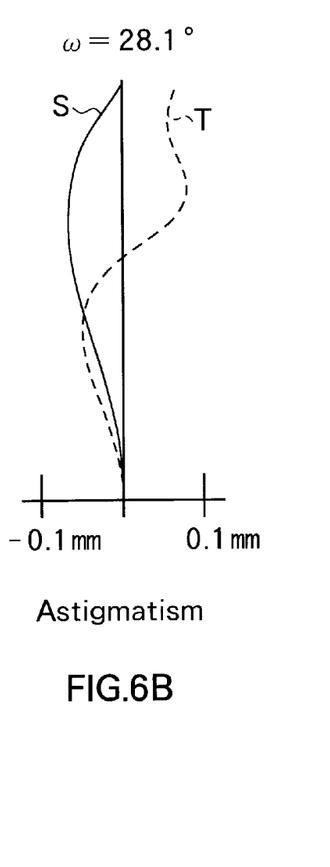
Figure 6C:
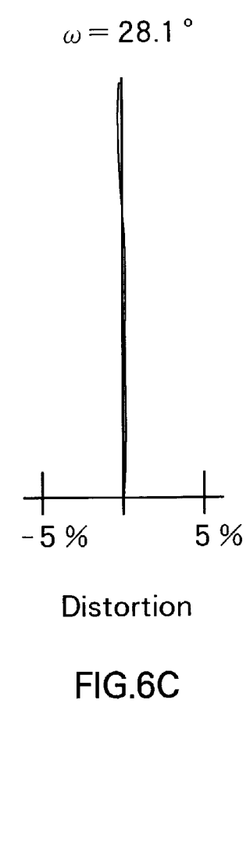
Figure 6D:
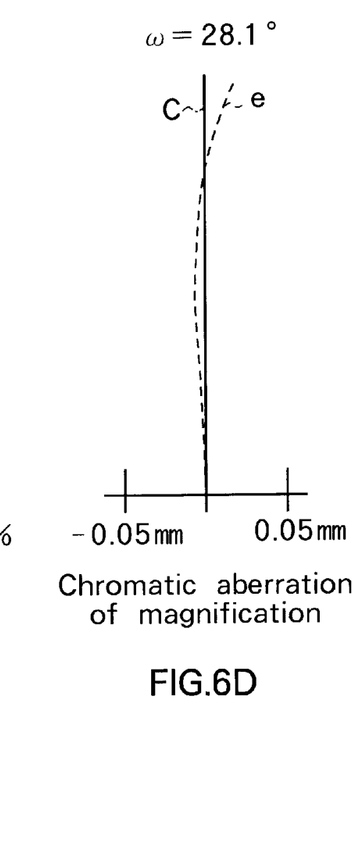

FIGS. 5A to 5C are tables of Example 1-2 using specific numeral values of the single-focus lens according to the embodiment. FIG. 4 is a diagram of the configuration of the single-focus lens of Example 1-2 corresponding to the numeral values in FIGS. 5A to 5C. The same symbols as those used in FIGS. 1 and 2A to 2C are used in FIGS. 4 and 5A to 5C.

The biggest difference in the lens configuration between the single-focus lenses of Example 1-1 and Example 1-2 is observed in the second lens L2, the third lens L3 and the fourth lens L4. The second lens L2 of Example 11 is a meniscus lens and its convex faces the object side, whereas the second lens L2 of Example 12 is a meniscus lens and its concave faces the object side. With regard to the third lens L3 and the fourth lens L4, neighboring lens surfaces are not in contact at the center thereof in Example 1-1, while the lenses take the form of a cemented lens, joining the lens surface S6 of the third lens to the lens surface S7 of the fourth lens in Example 1-2.

In the single-focus lens of Example 1-2, the lens surfaces S3 and S4 of the second lens L2 and the lens surfaces S8 and S9 of the fifth lens L5 are aspheric surfaces. The second lens L2 and the fifth lens L5 having aspheric surfaces are made of PMMA. FIG. 5B contains values of coefficients of the aspheric surface K, $A_4$, $A_6$, $A_8$ and $A_{10}$ indicating the shape of the surfaces S3, S4, S8 and S9. These coefficients of the aspheric surface are used in the polynomial (A).

FIG. 5C is a table containing focal distance f, F number (Fno) and field angle (2ω) f of the whole lens system showing performance of the single-focus lens according to Example 1-2. FIG. 5C also shows refractive power $1/f_2$ and $1/f_5$ corresponding to the conditional expressions (1) and (2).

In the single-focus lens of Example 1-2 as shown in FIG. 5C, the refractive power $1/f_2$ of the second lens L2 is −0.004, whereas the refractive power $1/f_5$ of the fifth lens L5 is 0.007, which satisfies the conditional expressions (1) and (2). The refractive index $nd_1$ of the first lens L1 relative to the d-line is 1.84665, which satisfies the conditional expression (3). The Abbe number $vd_1$ of the first lens L1 relative to the d-line is 23.9; the Abbe number $vd_3$ of the third lens L3 relative to the d-line is 23.9; and the Abbe number $vd_4$ of the fourth lens L4 relative to the d-line is 52.3, which satisfies the conditional expressions (4) to (6).

FIGS. 6A to 6D show spherical aberration, astigmatism, distortion and chromatic aberration of magnification in the single-focus lens of Example 1-2, respectively. The same symbols as those used in FIGS. 3A to 3D are used in FIGS. 6A to 6D.

As apparent from FIGS. 6A to 6D, the single-focus lens of Example 1-2 has a shorter overall length and exhibits optimal optical performance, e.g., for an imaging lens of electronic cameras.

The present invention is not limited to the above embodiment and various modifications are possible. For example, values of the radius of curvature r, the surface separation d, the refractive index n and the Abbe number v, which are lens elements, are not limited to the values shown in the above example and other values are possible.

The present invention is not only limited to the imaging lens for an electronic camera but to an imaging lens for a camera using silver-salt films and the like.

As has been described herein before, according to the single-focus lens of the invention, consecutively arranged from the object side are the first lens element with a meniscus shape having a concave which faces the object side, the second lens element with a meniscus shape having at least one aspheric surface, the third lens element with two concaves, the fourth lens element with two convexes and the fifth lens element with a meniscus having a concave which faces an image side, the fifth lens having at least one aspheric surface. Such a configuration allows the single-focus lens cost reduction and a simple configuration with a shorter overall length as well as preferable optical performance.

According to the single-focus lens of one aspect of the invention, the second lens element and the fifth lens element are made of optical plastics, so that the aspheric surface is easily processed, thereby improving productivity.

According to the single-focus lens of another aspect of the invention, the second lens element and the fifth lens element made of optical plastics satisfy the conditional expressions $-0.02<1/f_2<0.02$ and $-0.02<1/f_5<0.02$. Thus, the power of the second lens element and the fifth lens element is low. As a result, deterioration in optical performance due to environmental changes such as changes in temperature and humidity is reduced.

Obviously, many modifications and variations of the present invention are possible in the light of the above teachings. It is therefore to be understood that within the scope of the appended claims the invention may be practiced otherwise than as specifically described.

What is claimed is:

1. A single-focus lens, comprising: consecutively from an object side a first lens element with a meniscus shape having a concave surface which faces the object side;
   a second lens element with a meniscus shape having at least one aspheric surface;
   a third lens element with two concave surfaces;
   a fourth lens element with two convex surfaces; and
   a fifth lens element with a meniscus shape having a concave surface which faces an image side, the fifth lens element having at least one aspheric surface.

2. A single-focus lens according to claim 1, wherein the second lens element and the fifth lens element are made of optical plastics.

3. A single-focus lens according to claim 2, wherein conditional expressions $-0.02<1/f_2<0.02$ and $-0.02<1/f_5<0.02$, are satisfied when the $f_2$ represents a focal length of the second lens element and the $f_5$ represents a focal length of the fifth lens element.

4. A single-focus lens according to claim 1, wherein conditional expressions $1.70<nd_1$, $35>vd_1$, $35>vd_3$, and $35<vd_4$ are satisfied when the $nd_1$ represents a refractive index of the first lens element for a wavelength of d-lines, the $vd_1$ represents Abbe number of the first lens element for the wavelength of d-lines, the $vd_3$ represents Abbe number of the third lens element for the wavelength of d-lines, and the $vd_4$ represents Abbe number of the fourth lens element of the wavelength of d-lines.

5. A single-focus lens according to claim 2, wherein conditional expressions $1.70<nd_1$, $35>vd_1$, $35>vd_3$, and $35<vd_4$ are satisfied when the $nd_1$ represents a refractive index of the first lens element for a wavelength of d-lines, the $vd_1$ represents Abbe number of the first lens element for the wavelength of d-lines, the $vd_3$ represents Abbe number of the third lens element for the wavelength of d-lines, and the $vd_4$ represents Abbe number of the fourth lens element for the wavelength of d-lines.

6. A single-focus lens according to claim 3, wherein conditional expressions $1.70<nd_1$, $35>vd_1$, $35>vd_3$ and $35<vd_4$ are satisfied when the $nd_1$ represents a refractive index of the first lens element for a wavelength of d-lines, the $vd_1$ represents Abbe number of the first lens element for the wavelength of d-lines, the $vd_3$ represents Abbe number of the third lens element for the wavelength of d-lines, and the $vd_4$ represents Abbe number of the fourth lens element for the wavelength of d-lines.

* * * * *